(12) United States Patent
Barile

(10) Patent No.: US 6,448,485 B1
(45) Date of Patent: Sep. 10, 2002

(54) METHOD AND SYSTEM FOR EMBEDDING AUDIO TITLES

(75) Inventor: Steven E. Barile, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/809,019

(22) Filed: Mar. 16, 2001

(51) Int. Cl.7 .......................... A63H 5/00; G04B 13/00; G10H 7/00
(52) U.S. Cl. .................. 84/609; 84/600; 84/649; 84/477 R
(58) Field of Search ............... 84/600–604, 609–610, 84/615, 617, 618, 634, 645, 649–650, 653, 655–656, 666, 477 R, 478

(56) References Cited

U.S. PATENT DOCUMENTS

| 4,731,847 | A | * | 3/1988 | Lybrook et al. ............... 84/622 |
| 5,739,451 | A | * | 4/1998 | Winksy et al. ................. 84/609 |
| 5,844,158 | A | * | 12/1998 | Butler et al. ................... 84/600 |
| 5,895,876 | A | * | 4/1999 | Moriyama et al. ............. 84/609 |
| 5,918,303 | A | * | 6/1999 | Yamaura et al. ............... 84/609 |
| 6,169,543 | B1 | * | 1/2001 | Wehmeyer .................... 345/327 |
| 6,226,446 | B1 | * | 1/2001 | Murase et al. ................. 386/95 |
| 6,212,359 | B1 | * | 4/2001 | Knox .......................... 455/3.1 |

* cited by examiner

Primary Examiner—Marlon T. Fletcher
(74) Attorney, Agent, or Firm—Pillsbury Winthrop LLP

(57) ABSTRACT

A system and method for embedding audio titles is presented. Information encoded in a format is received about an audio program. The information is transformed into an audio signal conveying an audio description about the audio program. The audio description and the audio program are then embedded in a predetermined format.

30 Claims, 4 Drawing Sheets

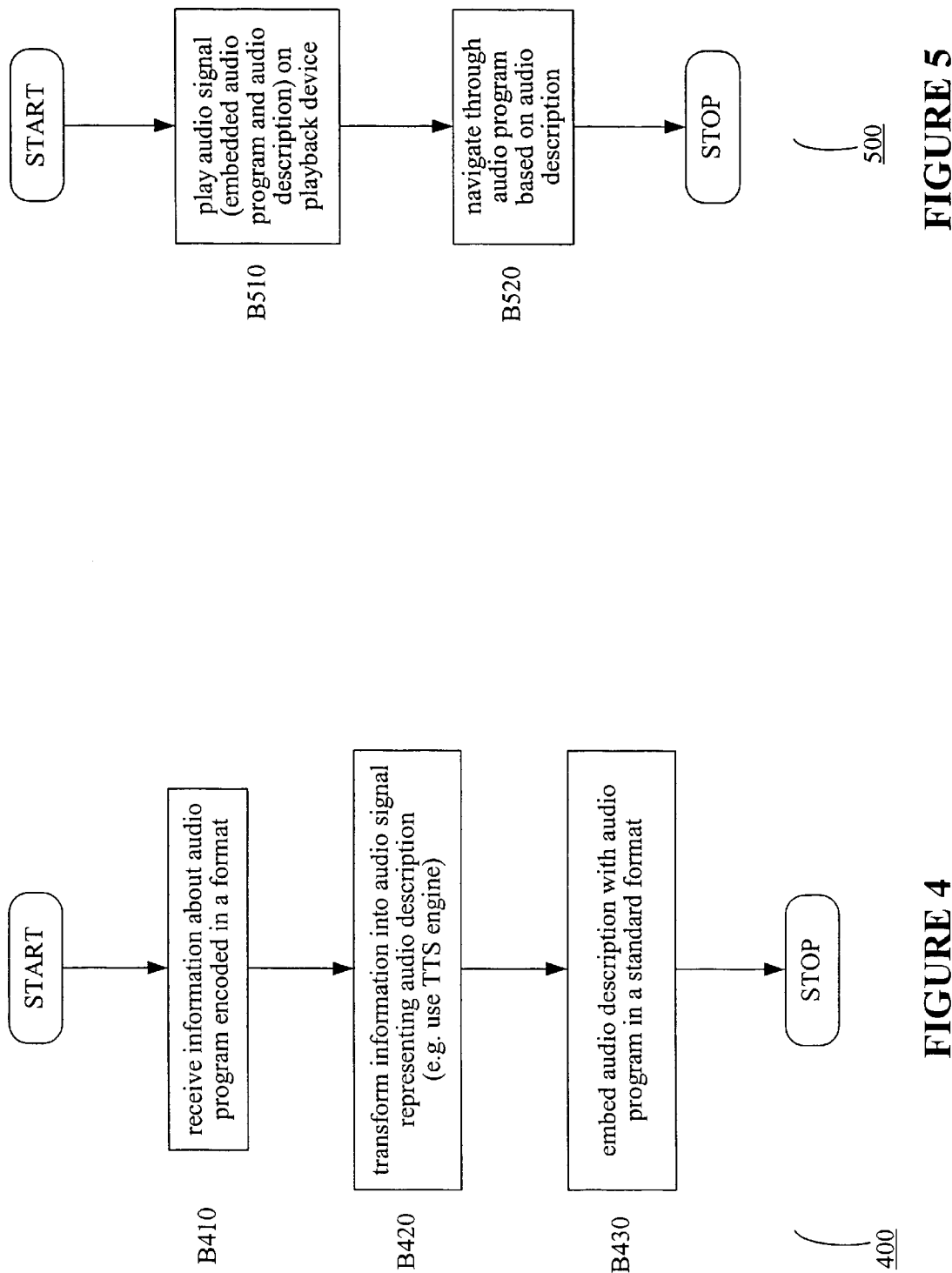

METHOD AND SYSTEM FOR EMBEDDING AUDIO TITLES

BACKGROUND

1. Field of the Invention

This invention relates in general to the field of multimedia. Specifically, this invention relates to methods and systems for delivering multimedia information.

2. General Background and Related Art

Digital audio is increasingly being delivered to listeners in compressed form. Sound compression formats, such as MPEG Layer 3 (MP3), Motion Picture Experts Group, ISO/IEC 11172-3 and ISO/IEC 13818-3, substantially compress audio data, yet maintain high sound quality. Tags have been developed to convey information that may relate to audio files. For instance, an ID3 tag may reside at the end of an MP3 file.

Within a tag conforming to the ID3v2.3.0 informal standard (see http://id3.org), a host of textual information may be included, such as artist, album, song, title, lyrics, and comments. The ID3 tag in both ID3v2.3.0 and later revisions of the format also provides for a "general encapsulated object," wherein any type of file may be encapsulated.

When they download compressed music or other such audio for playback on computers, personal digital music players, CD players, or the like, users often like to search for selections among downloaded music selections. Textual information associated with each selection, and derived from a tag, may be displayed on an LCD panel. As such, users must read the information in order to decide which selection they wish to hear. This process is not user-friendly, and it prevents visually-impaired individuals from enjoying the search features of the above devices.

Therefore, what is needed is a method and system that conveys information about audio programs in audio form.

BRIEF DESCRIPTION OF THE DRAWINGS

FIG. 4 is a flow diagram illustrating a method according to an embodiment of the present invention.

FIG. 5 is a flow diagram illustrating a method according to an embodiment of the present invention.

DETAILED DESCRIPTION

The following detailed description refers to the accompanying drawings that illustrate exemplary embodiments of the present inventions. Other embodiments are possible and modifications may be made to the embodiments without departing from the spirit and scope of the invention. Therefore, the following detailed description is not meant to limit the invention. Rather, the scope of the invention is defined by the appended claims.

It will be apparent to one of ordinary skill in the art that the embodiments as described below may be implemented in many different embodiments of software, firmware, and hardware in the entities illustrated in the figures. The actual software code or specialized control hardware used to implement the present invention is not limiting of the present invention. Thus, the operation and behavior of the embodiments will be described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with the presented embodiments may be stored in any storage device, such as, for example, a computer system (non-volatile) memory, an optical disk, magnetic tape, or magnetic disk. Furthermore, the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

A method for embedding audio titles, as described herein, involves receiving information, encoded in a format, about an audio program. The information is transformed into an audio signal that conveys an audio description of the audio program. The audio description and the audio program are then embedded in a predetermined format.

Figure 1:
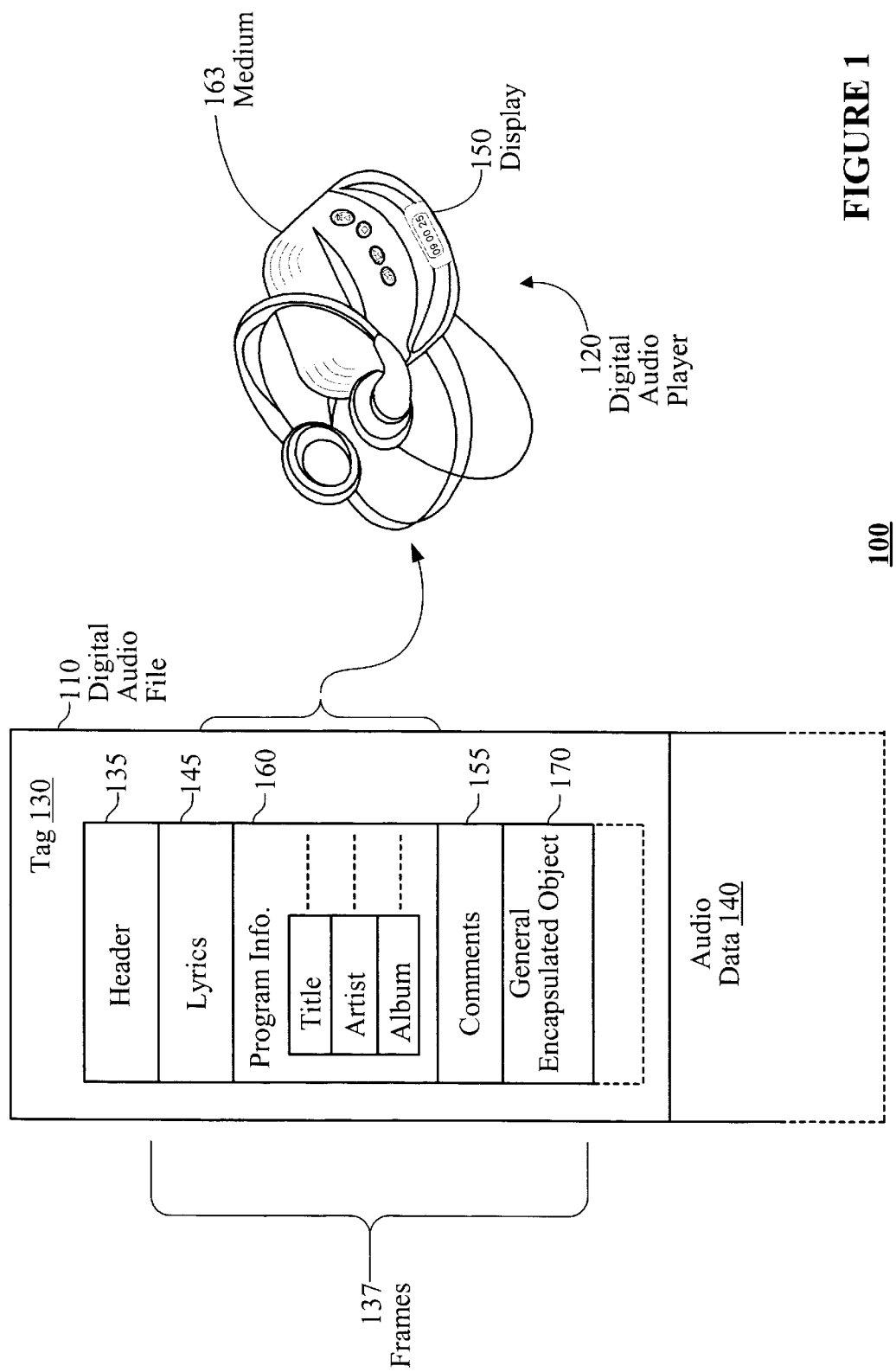
FIG. 1 illustrates a music system involving digital audio files.

FIG. 1 illustrates a music system involving digital audio files. As shown, system 100 includes a digital audio file 110, such as an MP3 file, recorded on a medium 163, and digital audio player 120.

Digital audio file 110 may have a predetermined format. In FIG. 1, digital audio file 110 comprises a tag 130, such as an ID3 tag, and audio data 140, which may include recorded sound, such as music or a narration of a book. Tag 130 may comprise metadata, or information about audio data 140, within digital audio file 110 itself.

More specifically, tag 130 may comprise a header 135 and frames 137. Header 135 may specify how tag 130 is structured. Frames 137 may comprise information blocks containing data. For instance, in FIG. 1, frames 135 may comprise data relating to lyrics 145, program information 160, comments 155, and general encapsulated object 170. Program information 160 may include information relating to the audio data 140, such as title, artist, and album. Different frames and headers may be included in tag 130 depending on the applicable format of digital audio file 110.

Digital audio player 120 may comprise many types of digital audio playback devices. For instance, digital audio player 120 may comprise a CD player, a car stereo system, a handheld personal digital music player, a digital audio player on a personal computer, and the like. Digital audio player 120 plays digital audio selections recorded on medium 163 for the listening enjoyment of a listener. It is to be noted that the present invention may also be applied in the domain of digital video, such as where a digital video file format contains metadata.

Digital audio player 120 may include a display 150. Display 150 may list information relevant to a selection recorded on medium 163. In FIG. 1, program information 160, namely title, artist, and album, has been read from frames 137 of tag 130 such that program information 160 from tag 130 is processed and displayed on display 150 of digital audio player 120. As such, a listener listening to, or searching among, various selections recorded on medium 163 may be informed of relevant information. Display 150 may also include information relating to the track number of the selection on medium 163, as well as the time elapsed for a selection that is being played or paused.

Figure 2:
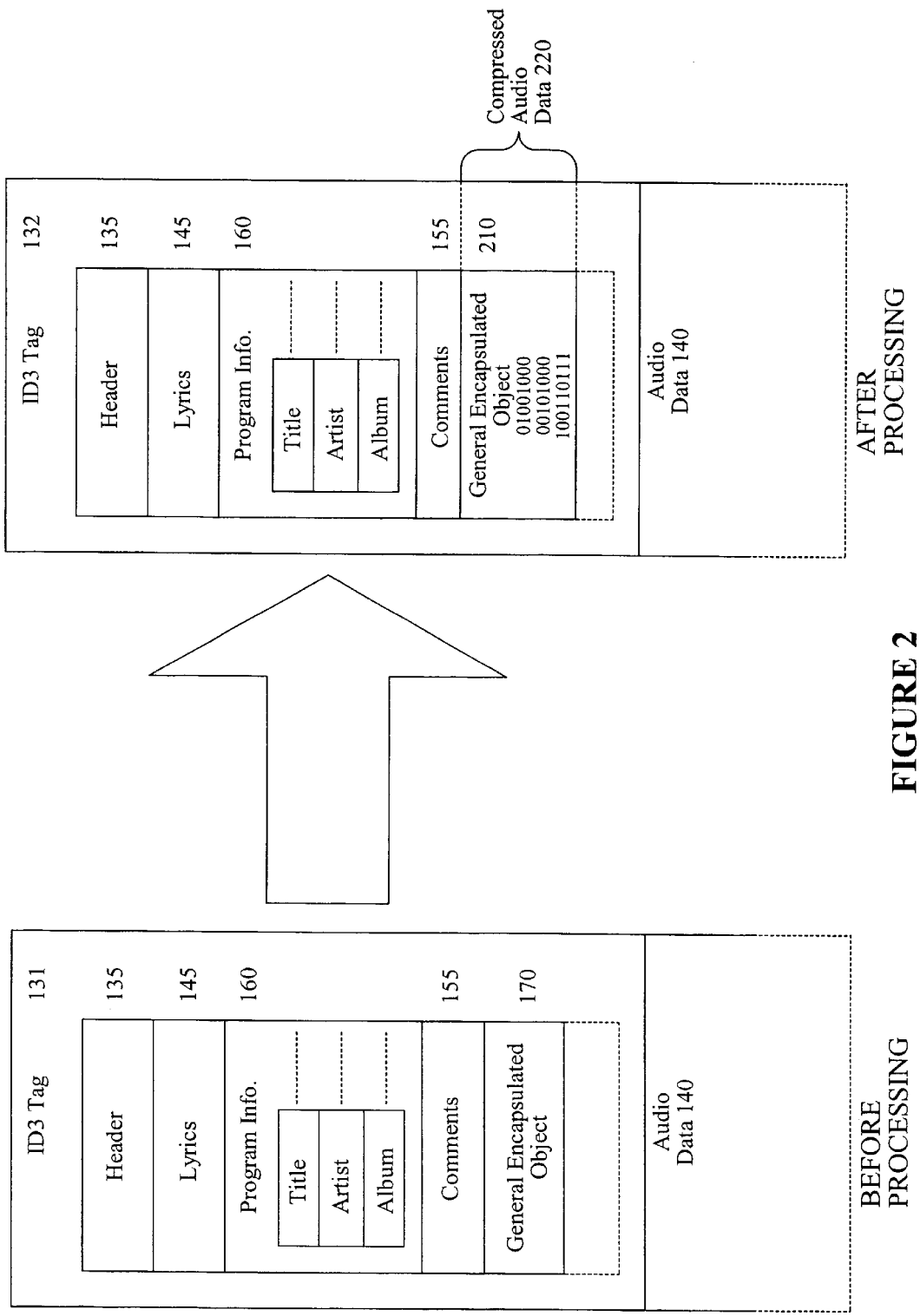
FIG. 2 illustrates an ID3 tag before and after processing according to an embodiment of the present invention.

FIG. 2 illustrates an ID3 tag before and after processing according to an embodiment of the present invention. Before processing, tag 131 includes general encapsulated object 170. In the ID3 format, general encapsulated object 170 is a frame containing any kind of encoded data. It is contemplated that other digital audio file formats could be designed to contain such a frame.

Tag 131 may be processed to produce tag 132. In tag 132, general encapsulated object 170 may include compressed audio data 220, shown in FIG. 2 by a binary numeric sequence. In an exemplary implementation of the present invention, program information 160, including title, artist, and album, are read from tag 131, recorded to an audio file via a voice synthesizer, such as a text-to-speech (TTS) engine, and embedded within general encapsulated object 210 of tag 132 as compressed audio data 220.

Compressed audio data 220 may comprise a narrative audio description which includes information besides program information 160. In other embodiments, encoded text or other types of data may be embedded within general encapsulated object 210. For instance, paragraphs of explanatory text, biographical information relating to an artist, or compressed video data may be embedded. The size of a frame, such as general encapsulated object 210, may impose practical limitations on the quantity and type of data suitable for embedding within a digital audio file.

Figure 3:
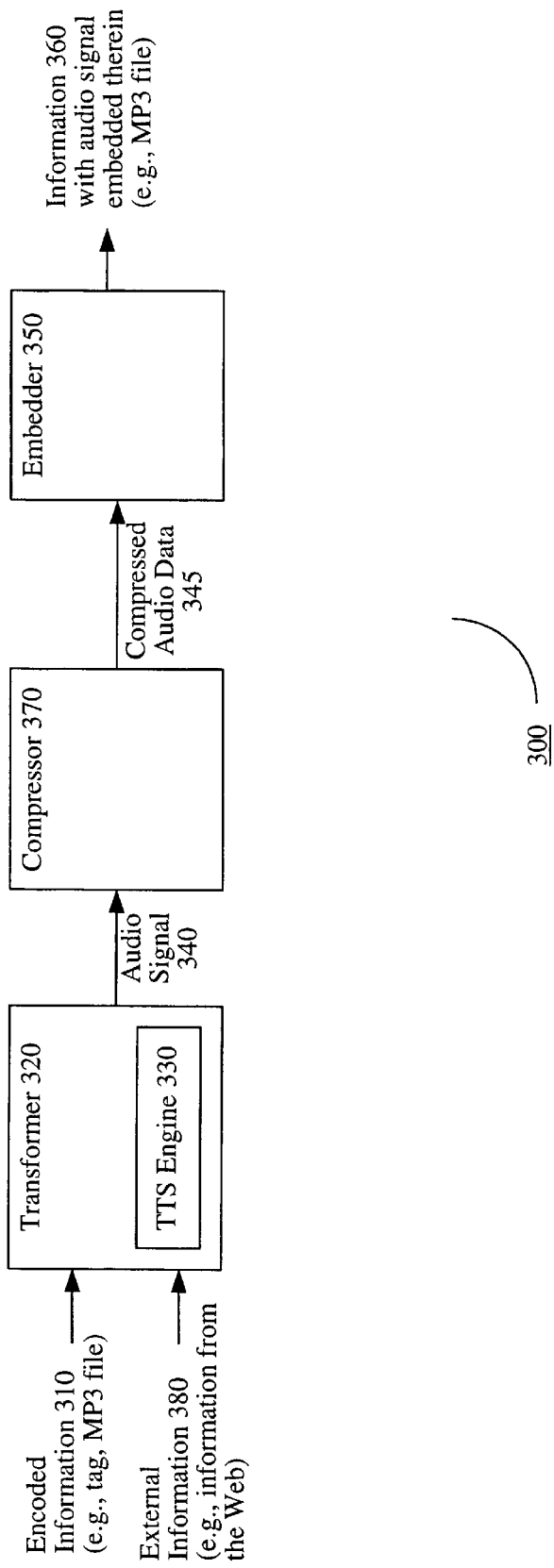
FIG. 3 is a high-level block diagram of a system according to an embodiment of the present invention.

FIG. 3 is a high-level block diagram of system 300 according to an embodiment of the present invention. System 300 comprises transformer 320, compressor 370, and embedder 350. Transformer 320 may comprise TTS engine 330. Transformer 320 may receive encoded information 310, such as tag 131 or an entire digital audio file. Via header information in tag 131, transformer 320 may extract information from frames in tag 131. Transformer 320 may also receive external information 380, which is external to tag 131 and may include information from local or remote sources, such as databases accessible via the World Wide Web.

Transformer 320 may combine information extracted from tag 131 with external information 380. For instance, program information relating to a music selection in tag 131 may be combined with words and phrases to produce a narrative sentence, such as "Song 1 is The Star-Spangled Banner by Francis Scott Key." In some embodiments, user preferences, system defaults, or a combination thereof may specify which information in tag 131, and which external information 380, is included in the narrative. TTS engine 330 may process the combined textual data, translating it into speech signals. The speech signals may be recorded as an audio signal 340 and outputted by transformer 320.

Compressor 370 receives audio signal 340 from transformer 320. Compressor 370 compresses audio signal 340 into compressed audio data 345. For instance, if encoded information 310 is received in MP3 format, compressor 370 may compress audio signal 340 such that compressed audio data 345 is appropriately compressed for embedding in an MP3 file. It is to be appreciated that compressor 370 may be incorporated into embedder 350.

Embedder 350 receives compressed audio data 345 from compressor 370. Embedder 350 embeds compressed audio data 345 within general encapsulated object 210 of a tag. Embedder 350 may output information 360 with an audio signal embedded therein. For instance, information 360 may comprise a digital audio file, such as tag 132 contained in a digital audio file, as shown in FIG. 2 above. Information 360 may be stored to a nonvolatile memory, such as a CD-ROM.

FIG. 4 is a flow diagram illustrating method 400 for embedding audio descriptions according to the present invention. In block B410, information about an audio program is received. The information may be encoded in a format when received. In block B420, the information is transformed into an audio signal that conveys an audio description relating to an audio program. In block B430, the audio description produced by block B420 is embedded along with an audio program in a predetermined format.

FIG. 5 is a flow diagram illustrating method 500 for navigating through audio programs according to the present invention. In block B510, an audio signal is played on a playback device. The audio signal includes an audio program and an audio description embedded within the audio signal. In block B520, a user may navigate through audio programs based on the audio description, which may be played at predetermined times, such as when the user issues navigation commands to search through various selections on a medium. Such commands may include "play," "skip," and "repeat."

Method 500 may provide an "eyes-free" method for navigating through audio programs. Indeed, a listener may listen to an audio description to acquire information about selections on a medium. Thus, a playback device need not include an LCD panel and associated circuitry. In some embodiments, a playback device used in conjunction with method 500 may include an LCD panel, and the playback of audio descriptions may be selectively activated or deactivated by a user. In other embodiments, Braille-equipped navigation buttons may be included on the playback device. In other implementations, an audio playback device may incorporate speech processing technologies that process and act upon navigation commands spoken by a user.

The foregoing description of the preferred embodiments is provided to enable any person skilled in the art to make or use the present invention. Various modifications to these embodiments are possible, and the generic principles presented herein may be applied to other embodiments as well. For example, descriptive material may be embedded in digital audio and video files, wherein the material is applicable to all or some selections on a medium. Similarly, timely announcements of advertisements, promotions, concert tours, television specials, and other such external information that may relate to the selections may be embedded within the files. The embedded information may be downloaded from the World Wide Web.

Further, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Specifically, transformer 320, compressor 370, and embedder 350 may be implemented individually and interconnected, or implemented as one multifunctional module.

As such, the present invention is not intended to be limited to the embodiments shown above but rather is to be accorded the widest scope consistent with the principles and novel features disclosed in any fashion herein.

What is claimed:

1. A method for embedding audio titles, said method comprising:

receiving information, encoded in a format, about an audio program;

transforming said information into an audio signal representing an audio description about said audio program, said audio description being audible to a listener when played on an audio playback device; and embedding said audio description, with said audio program, in a predetermined format.

2. The method according to claim 1, wherein said information about said audio program includes a title of said audio program.

3. The method according to claim 1, wherein said information about said audio program includes a description about said audio program.

4. The method according to claim 1, wherein said audio program includes a piece of music.

5. The method according to claim 1, wherein said audio description includes information downloaded from an information source, the information source having information different from said information about said audio program.

6. The method according to claim 1, wherein said format of said information includes a text format.

7. The method according to claim 6, wherein said transforming includes transforming said information in said text format into said audio signal using a text-to-speech engine.

8. The method according to claim 1, wherein said format of said information includes an audio format.

9. The method according to claim 1, wherein said predetermined format includes an MP3 ID3 tag.

10. The method of claim 1, further comprising storing said embedded audio description to a nonvolatile memory.

11. The method of claim 1, wherein said audio description includes compressed data.

12. A method for navigating through audio programs, said method comprising:

playing back, on an audio playback device, an audio signal comprising at least one embedded audio program and at least one audio description relating to said at least one audio program, said audio description being audible to a listener when played; and navigating through said at least one audio program based on said at least one audio description.

13. The method according to claim 12, wherein said audio playback device includes a CD player.

14. The method according to claim 12, wherein said audio playback device includes a car stereo system.

15. The method according to claim 12, wherein said audio playback device includes a handheld device.

16. The method according to claim 12, wherein said audio playback device includes a personal digital music player.

17. The method according to claim 12, wherein said audio playback device includes an MP3 player on a personal computer.

18. The method according to claim 12, wherein said navigating is achieved by executing navigation commands.

19. The method according to claim 18, wherein said navigation commands include at least one of "play", "skip", and "repeat".

20. The method according to claim 18, wherein said navigation commands are issued through voice commands.

21. A system for embedding audio titles, said system comprising:

a transformer configured to receive information, encoded in a format, about an audio program, said transformer being further configured to transform said information into an audio signal representing an audio description about said audio program, said audio description being audible to a listener when played on an audio playback device; and an embedder configured to embed said audio description, with said audio program, in a predetermined format.

22. The system according to claim 21, wherein said transformer includes a text-to-speech engine configured to transform said information in said text format into said audio signal.

23. A computer-readable medium encoded with a plurality of processor-executable instruction sequences for:

receiving information, encoded in a format, about an audio program;

transforming said information into an audio signal representing an audio description about said audio program, said audio description being audible to a listener when played on an audio playback device; and embedding said audio description, with said audio program, in a predetermined format.

24. The computer-readable medium according to claim 23, wherein said information about said audio program includes a description about said audio program.

25. The computer-readable medium according to claim 23, wherein said format of said information includes a text format.

26. The computer-readable medium according to claim 25, wherein said transforming includes transforming said information in said text format into said audio signal using a text-to-speech engine.

27. The computer-readable medium according to claim 23, wherein said predetermined format includes an MP3 ID3 tag.

28. A computer-readable medium encoded with a plurality of processor-executable instruction sequences for:

playing back, on an audio playback device, an audio signal comprising at least one embedded audio program and at least one audio description relating to said at least one audio program, said audio description being audible to a listener when played; and navigating through said at least one audio program based on said at least one audio description.

29. The computer-readable medium according to claim 28, wherein said audio playback device includes a personal digital music player.

30. The computer-readable medium according to claim 28, wherein said audio playback device includes a digital music player on a personal computer.

\* \* \* \* \*